(12) United States Patent
Suhr et al.

(10) Patent No.: US 6,466,337 B1
(45) Date of Patent: Oct. 15, 2002

(54) PROCESS FOR CALIBRATING A SCANNER

(75) Inventors: Holger Suhr, Kiel; Axel Heuer, Fahren, both of (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/308,896

(22) PCT Filed: Nov. 19, 1997

(86) PCT No.: PCT/DE97/02711

§ 371 (c)(1),
(2), (4) Date: Jul. 12, 1999

(87) PCT Pub. No.: WO98/25400

PCT Pub. Date: Jun. 11, 1998

(30) Foreign Application Priority Data

Dec. 2, 1996 (DE) .......................................... 196 49 797

(51) Int. Cl.$^7$ ................................................ H04N 1/40
(52) U.S. Cl. ...................... 358/446; 358/504; 358/509; 358/505; 358/406; 358/516; 348/223
(58) Field of Search ................................ 358/446, 447, 358/448, 487, 474, 504, 505, 506, 509, 516, 406; 348/200, 210, 224, 255; 382/151

(56) References Cited

U.S. PATENT DOCUMENTS

| | | | | |
|---|---|---|---|---|
| 3,772,459 A | * | 11/1973 | Nakajima | |
| 4,136,360 A | * | 1/1979 | Hoffrichter et al. | |
| 4,158,859 A | * | 6/1979 | Kerbel | |
| 4,633,301 A | * | 12/1986 | Saitoh | |
| 4,907,076 A | * | 3/1990 | Ohsawa | |
| 4,907,077 A | * | 3/1990 | Schulz-Hennig et al. | |
| 4,920,428 A | * | 4/1990 | Lin et al. | |
| 4,980,759 A | * | 12/1990 | Smyth | |
| 5,153,745 A | * | 10/1992 | Brandkamp et al. | |
| 5,182,658 A | * | 1/1993 | Ishizaki et al. | |
| 5,296,944 A | * | 3/1994 | Suzuki et al. | |
| 5,319,449 A | * | 6/1994 | Saito et al. | |
| 5,414,535 A | * | 5/1995 | Kanmoto et al. | |
| 5,514,865 A | * | 5/1996 | O'Neil | |
| 5,703,700 A | * | 12/1997 | Birgmeir et al. | |
| 5,748,803 A | * | 5/1998 | Schielke | |
| 5,982,957 A | * | 11/1999 | Decaro et al. | |
| 5,995,142 A | * | 11/1999 | Matsufune | |
| 6,067,175 A | * | 5/2000 | Heur et al. | |

FOREIGN PATENT DOCUMENTS

| | | | | |
|---|---|---|---|---|
| GB | 2148658 | * | 5/1985 | |
| GB | 3527237 | * | 3/1988 | ............ H04N/1/38 |
| JP | 6298872 | * | 8/1987 | |

\* cited by examiner

Primary Examiner—Edward Coles
Assistant Examiner—Tia A Carter
(74) Attorney, Agent, or Firm—Schiff Hardin & Waite

(57) ABSTRACT

In a process for calibrating an optoelectronic scanning member of a scanner which scans an image point by point and line by line and converts the modulated scanning light into image values in a light/voltage converter, converter densities are first determined and stored as a converter density table depending on different degrees of amplification of the light/voltage converter. The densities of the scanning diaphragms and grey filters used are also determined and stored as diaphragm density and grey filter density tables. A scanner-specific calibration is carried out with a reference diaphragm by adjusting the degree of amplification so that the image value corresponds to a predetermined white level. When a document-specific calibration is later carried out, the required amplification is automatically determined from the stored density tables and the white point density of the document in question. The light/voltage converter is then adjusted accordingly. This calibrating process considerably shortens the time of preparation required for scanning a document and discharges the operator from routine calibration tasks.

25 Claims, 1 Drawing Sheet

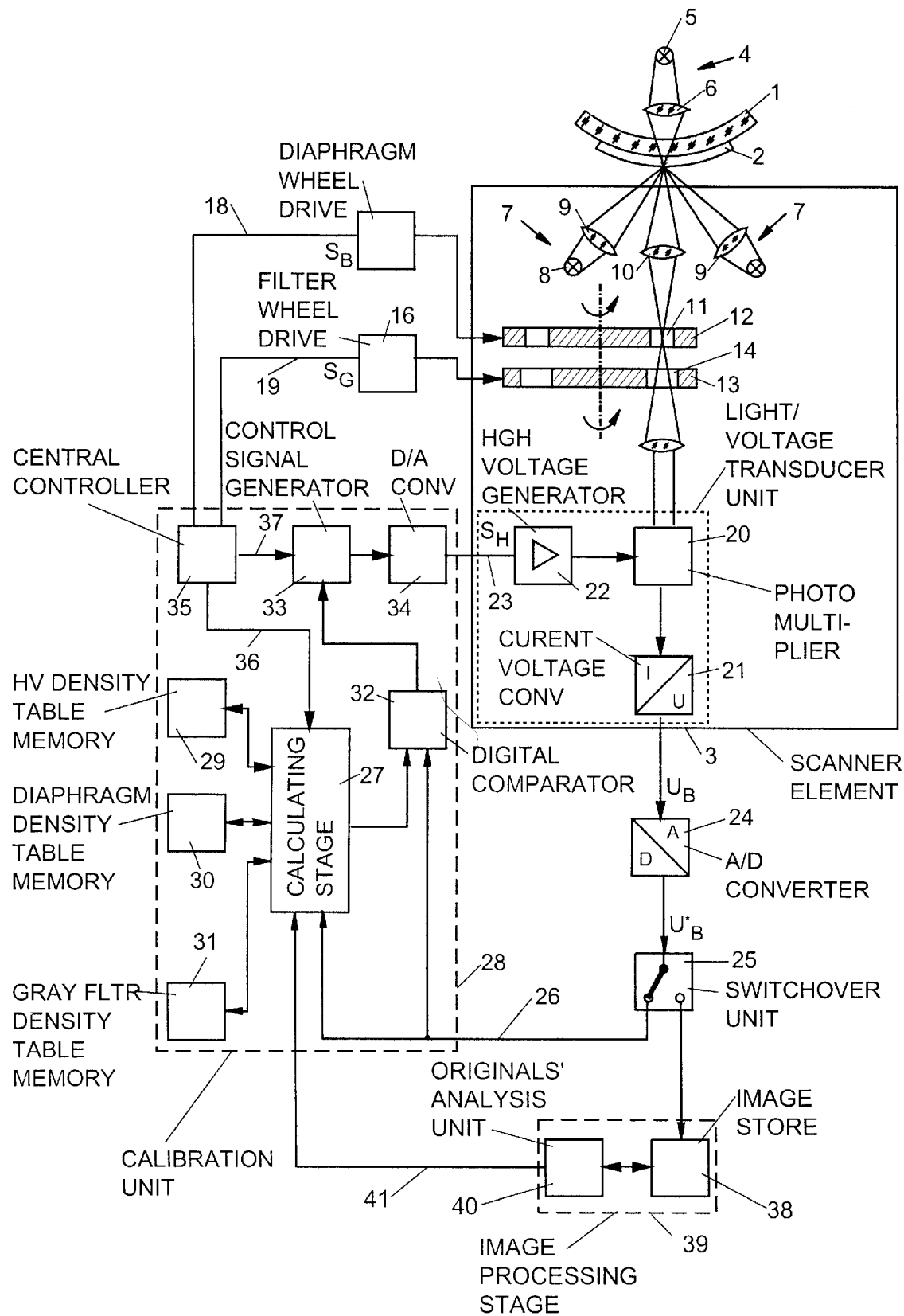

PROCESS FOR CALIBRATING A SCANNER

BACKGROUND OF THE INVENTION

The invention is in the field of electronic reproduction technology and is directed to a method for calibration of an optoelectronic scanner element of a scanner device for point-by-point and line-by-line scanning of image originals. The a scanner device, also referred to as scanner, can be a black-and-white scanner for scanning black-and-white image originals, or can be a color scanner for scanning chromatic image originals.

Given a black-and-white scanner, a black-white image original is illuminated pixel-by-pixel by a light source and the scan light modulated by the brightnesses of the scanned pixels is converted with an optoelectronic converter into an image signal that represents the brightness values of the scanned image original between "black" and "white".

Given a color scanner, the scan light coming from the image original is first resolved with dichroitic filters into red, green and blue parts and is supplied to the three color channels of a color scanner. The chromatic light parts are then converted with optoelectronic transducers into three color signals that represent the color parts "red", "green" and "blue" of the pixels scanned in the color original.

The image signals or, color signals are further-processed in signal editing stages. The signal editing stages have a defined signal input range of which one corner value is referred to as a white level.

The total range of an image original to be scanned is matched to the defined signal input range of the signal editing stages by a calibration of a black-and-white scanner or color scanner before the beginning of scanning, in that the scan light coming from the brightest location of the image original, the white point, is converted into an image signal value or, into a color signal value per color channel that corresponds to the white level.

DE-A-25 45 961 has already disclosed a method for the automatic calibration of scanners. In a calibration phase, the color scanner element of a black-and-white scanner is positioned to the respective white point of the image original, and the scan light coming from the targeted white point is converted in the optoelectronic transducer into an actual image signal value. The actual image signal value is compared in a control unit to a rated image signal value that corresponds to the white level. A control signal modifies the gain of the optoelectronic transducer and/or of a following amplifier until the repetitive error is zero. The control signal value required for this purpose is stored for the duration of the original's scanning that follows the calibration phase. The control unit is expanded to the three color channels for the white balance given color scanners.

The known method has the disadvantage that a corresponding white point on the image original to be reproduced must always be approached with the color scanner element in the calibration, this time-consuming and, particularly given repetitions of the a white balancing, being imprecise. Added thereto is that a brightest image location suitable as white point is often not present in a chromatic image original.

EP-A-0 281 659 recites a further method for the calibration of scanners, whereby the repeated approach of a white point with the color scanner element on an image original to be reproduced is avoided. For that purpose, a light attenuation factor is determined by optoelectronic scanning of the white point in the initial white balancing. Given repetitions of the white balancing, the scan light coming from the white point is simulated by the light of the light source attenuated corresponding to the identified light attenuation factor without renewed scanning of the white point in the image original, whereby the light attenuation is undertaken with a controlled iris diaphragm.

The known method is complicated and is based on a color-neutral density simulation, which is not always established in practice, and can therefore occasionally lead to unsatisfactory results. Further, no density simulation in the scanning of opaque originals is possible given the known method since the iris diaphragm is required for the correct setting of the depth of field.

SUMMARY OF THE INVENTION

It is therefore an object of the present invention to improve a method for the calibration of an optoelectronic scanner element of a scanner device for point-by-point and line-by-line scanning of image originals such that a calibration that can be implemented simply and in a short time is enabled.

This object is achieved according to the invention by providing a method for calibration of an optoelectronic scanner element of the scanner device for point-by-point and line-by-line scanning of the image, originals. The image original is illuminated and the scan light modulated with densities of the scanned image original is converted into image values with a light/voltage transducer unit. The white level is prescribed. The calibration of the scanner element is undertaken by changing a gain of the light/voltage transducer unit such that the image value generated when scanning the brightest location of the image original, the white point, corresponds to the predetermined white level. The light/voltage transducer unit is charged with a calibration light. The transducer densities as a criterion for attenuation of the calibration light respectively simulated by the different gains are measured from the measured image values given different gains of the light/voltage transducer unit. The identified transducer densities are allocated to the corresponding gains as a transducer density table. Diaphragm densities as a criterion for the attenuation of the calibration light achieved with the respective scanned diaphragms are determined from the image values that were measured given different scan diaphragms in the calibration light. The identified diaphragm densities are allocated to the corresponding scan diaphragms as a diaphragm density table. A reference diaphragm on the corresponding reference diaphragm density are determined from the diaphragm density table. Calibration is implemented with the identified reference diaphragm by setting the gain of the light/voltage transducer unit such that the image value acquired with the calibration light attenuated by the reference diaphragm corresponds to the predetermined white level. The reference transducer density belonging to the gain that has been set is determined from the transducer density table. The scan diaphragm for scanning the image original and the corresponding diaphragm density are determined from the diaphragm density table. An overall density is calculated from the reference diaphragm density, the reference transducer density, the diaphragm density of the scan diaphragm, and from the density of the white point of the image original. A gain of the light/voltage transducer unit that is allocated in the transducer density table to that transducer density that corresponds to the calculated overall density is determined. The gain that has been determined is set at the light/voltage transducer unit for scanning the image original.

The calibration method of the invention is composed of device-specific and master-specific steps.

In the device-specific steps, the characteristic of the light/voltage transducer unit is first registered, and the densities of the scan diaphragms and gray filters are identified and stored in the form of value tables. Subsequently, a device-specific, automatic calibration occurs. The device-specific steps need only be advantageously implemented at great time intervals or given a replacement of component parts in the scanner devices.

In the master-specific steps, the required gain of the light/voltage transducer unit is automatically identified merely from the previously stored value tables and the respective white point density of the image master to be scanned and is set at the light/voltage transducer means.

The preparation time for the originals' scanning is significantly shortened as a result of the calibration method and the operator is relieved of routine calibration jobs.

The invention is explained in greater detail below with reference to the example of a black-and-white scanner on the basis of the drawing figure.

BRIEF DESCRIPTION OF THE DRAWING

The drawing FIGURE shows a schematic block circuit diagram of a black-and-white scanner with a calibration unit. An image original (2) in the form of an opaque or transparency image original that is scanner point-by-point and line-by-line by an optoelectronic scanner element (3) is mounted on a scanner drum (1) composed of transparent glass that is only shown excerpted.

DESCRIPTION OF THE PREFERRED EMBODIMENTS

For point-by-point illumination of the transparency image original (23), a transparency illumination unit (4) having a light source (5) and a lens (6) is arranged in the inside of the scanner drum (2). For a point-by-point illumination of the opaque image original (2), an opaque illumination unit (7) having, for example, two light sources (8) and two lenses (9) is located in the optoelectronic scanner element (3).

The scan light allowed to pass by the transparency image original (2) or reflected by the opaque image original (2), and which is modulated according to the brightnesses of the picture elements scanned in the image original (2), proceeds via lens 161 into the scanner element (3). Therein, the scan light is focused with a scanner objective (10) onto one of the scanner diaphragms (11) of a rotatable diaphragm wheel (12). The diaphragm wheel (12) comprises a plurality of scanner diaphragms (11) having different diameters. One criterion for the light attenuation achieved with a scanner diaphragm (11) is the diaphragm density $D_B$.

The diaphragm wheel (12) is followed by a rotatable filter wheel (13) having a plurality of gray filters (14) of different strength. One criterion for the light attenuation achieved with a gray filter (14) is the gray filter density $D_G$.

The diaphragm wheel (12) is positioned by a diaphragm wheel drive (15) and the filter wheel (13) is positioned by a filter wheel drive (16) such that a scanner diaphragm (11) of the diaphragm wheel (12) respectively selected according to the desired light attenuation and, potentially, a gray filter (14) of the filter wheel (13) in addition are positioned in the beam path of the scan light. Diaphragm wheel drive (15) and filter wheel drive (16) are driven by control signals $S_B$ and $S_G$ on lines (18, 19).

Via, for example, a collimation optics (17); the scan line proceeds onto a light/voltage transducer unit (20, 21, 22) that is composed of a photo multiplier (20), a following current/voltage converter (21) and a high-voltage generator (22) in the exemplary embodiment. The gain of the photo multiplier (20) is set via the high-voltage $U_H$ that is generated in the high-voltage generator (22). The high-voltage generator (22) is controlled by control signal values $S_H$ on a line (23) that, thus, determine the gain of the photo multiplier (20) via the high-voltage $U_H$.

The current/voltage converter (21) generates analog voltage values $U_B$ from the output current of the photo multiplier (20), said analog voltage values $U_B$ being converted in a following A/D converter (24) into digital voltage values $U^*_B$.

The A/D converter (24) is followed by a switchover unit (25) having the switch positions "calibration" and "scanning".

During the calibration of the black-and-white scanner, the scanner element (3) is positioned outside the image original (2) on the transparent glass of the scanner drum (1). In this position of the scan element (3), the unmodulated light generated by the light source (5) of the transparency illumination unit (4) proceeds directly as calibration light into the scanner element (3). The calibration light is attenuated in the scanner element (3) by a selected scanner diaphragm (11) of the diaphragm wheel (12) and, potentially, is additionally attenuated by a selected gray filter (14) of the filter wheel (13). The digital voltage values $U^*_B$ generated by the attenuated calibration light given different gains of the light/voltage transducer unit (20, 21, 22) are supplied to a calculating stage (27) in a calibration unit (28) via the switchover unit (25) in the switch position "calibration" and via a line (26).

The calculating stage (27) has an interactive connection to a high-voltage density table memory (29), with a diaphragm density table memory (30) and with a gray filter density table memory (31). The calibration unit (28) also comprises a digital comparator (32) for comparing actual voltage values to a rated voltage value, comprises a control signal generator (33) with a following D/A converter (34) for generating the control signal values $S_H$ for the high-voltage generator (22) and also comprises a central controller (35). The central controller (35) has an interactive connection via a line (36) with the calculating stage (27) and with the control signal generator (33) via a line (37). The central controller (35) also generates the control signals $S_B$ and $S_G$ for the diaphragm wheel drive (15) and the filter wheel drive (16) on the lines (18, 19).

During the originals' scanning, the switchover means (25) is in the switch position "scan" in which the digital voltage values $U^*_B$ acquired by point-by-point and line-by-line scanning of the image original (2) are stored in an image store (38) of an image processing stage (39) as digital image values for further-processing. The image processing stage (39) also comprises an originals' analysis unit (40) that communicates with the image store (38). The density $D_W$ of the white point, the brightest location in the image master (2), is determined in the originals' analysis unit (40) from the image values $U^*_B$ of the image original (2) stored in the image store (38). The white point density $D_W$, also called calibration value, is supplied to the calculating stage (27) in the calibration unit (28) via a line (41).

Given a color scanner, a color splitter is additionally located in the scanner element, said color splitter resolving the chromatic scan light coming from the scanned, chromatic color original (2) into the three color parts "red" (R), "green" (G) and "blue" (B) and supplying them to three separate color channels. The three color channels each comprise a light/voltage transducer unit (20, 21, 22), an A/D converter (24) and a switchover means (25). The three color values R, G and B that are optionally supplied to the common image processing stage (39) or to a respective calibration unit (28) allocated to each and every color channel are generated as digital voltage values $U^*_B$ in the three color channels.

The inventive method for calibrating an optoelectronic scanner device is set forth in greater detail below, again with reference to the example of a black-and-white scanner on the basis of method steps [A] through [G]. Given a color scanner, the method is analogously applied to each of the three color channels.

In a method step [A], a characteristic transducer characteristic $D_H=f(S_H)$ is determined for the light/voltage transducer unit (20, 21, 22) in that, first, the relationship between a plurality of control signal values $S_H$ for the high-voltage setting and the voltage values $U^*_B$ measured at the output of the light/voltage transducer unit (20, 21, 22) is determined and then what is referred to as high-voltage densities $D_H$ are then calculated from the measured voltage values $U^*_B$. In a certain sense, the high-voltage densities $D_H$ are a criterion for a light attenuation simulated via the gain of the light/voltage transducer unit (20, 21, 22).

For implementation of method step [A], the scanner element (3) is first positioned outside the image original (2) on the transparent glass of the scanner drum (1), so that the light of the light source (5) proceeds into the scanner element (3) as calibration light. Moreover, a suitable scan diaphragm (11) of the diaphragm wheel (12) is selected and pivoted into the beam path of the calibration light by turning the diaphragm wheel (12) with the diaphragm drive (15). The scan diaphragm (11) is selected such that the calibration light coming from the light source (5) and attenuated by the scan diaphragm (11) causes no over-modulation of the light/voltage transducer unit (20, 21, 22) or, respectively, of the following A/D converter (24). On the other hand, the light attenuation dare only be so strong that the measured voltage values $U^*_B$ at the output of the light/voltage transducer unit (20, 21, 22) still allow an exact measured result.

After this, the control signal generator (33) successively calls control signal values $S_H$ that decrease in graduated fashion and that are converted in the high-voltage generator (22) into a corresponding plurality of decreasing high-voltage values $U_H$. For example, the control signal values $S_H$ from 4000 through 0 are called, these then being converted into the high-voltage values $U_H$ from 800 V through 300 V of the high-voltage range. The voltage values $U^*_B$ measured for the individual high-voltage values $U_H$ are supplied via the line (26) to the calculating stage (27) wherein the corresponding high-voltage densities $D_H$ are then calculated for the transducer characteristic $D_H=f(S_H)$.

In the calculation of the high-voltage densities $D_H$, the high-voltage density $D_H$ allocated to the maximum control signal value $S_{Hmax}$ is set to zero, and the high-voltage densities $D_H$ for the decreasing control signal values $S_H$ are then calculated as a respective logarithmized quotient from a currently measured voltage value $U^*_{B(n+1)}$ and from the previously measured voltage value $U^*_{B(n)}$, being calculated according to equation [1].

$$D_{H(n)} = \log U^*_{B(n+1)}/U^*_{B(n)} \qquad [1]$$

When the measured voltage values $U^*_B$ nonetheless become to small in the determination of the high-voltage densities $D_h$, the previously selected scan diaphragm (11) of the diaphragm wheel (12) can be enlarged during the ongoing calculations. In this case, the first high-voltage density $D_H$ calculated with the enlarged scan diaphragm (11) is again set to zero and one then proceeds as described. The offset that has arisen due to the renewed resetting must be compensated in the determination of the ultimate transducer characteristic $D_H=f(S_H)$.

The high-voltage densities $D_H$ calculated in the calculating stage (27) are deposited in the high-voltage density table memory (29) of the calibration unit (28) as value table $D_H=f(S_H)$ for further employment, being addressable by the corresponding control signal values $S_H$.

An example of such a value table $D_H=f(S_H)$ for a black-and-white scanner or for one color channel of a color scanner is reproduced below.

| Control Signal Values $S_H$ | High-Voltage Density $D_H$ |
|---|---|
| 4000 | 0.00 |
| 3800 | 0.11 |
| 3600 | 0.21 |
| 3400 | 0.32 |
| 3200 | 0.42 |
| 3000 | 0.53 |
| 2800 | 0.63 |
| 2600 | 0.74 |
| 2400 | 0.84 |
| 2200 | 0.95 |
| 2000 | 1.05 |
| 1800 | 1.16 |
| 1600 | 1.26 |
| 1400 | 1.37 |
| 1200 | 1.47 |
| 1000 | 1.58 |
| 800 | 1.68 |
| 600 | 1.79 |
| 400 | 1.89 |
| 200 | 2.00 |
| 0 | 2.10 |

In a method step [B], the diaphragm density $D_B$ for each scan diaphragm (11) of the diaphragm wheel (12) is determined in the form of a diaphragm density table for the light attenuation achieved with the corresponding scan diaphragm (11).

For implementation of method step [B], the scan element (3) is again positioned on the transparent glass of the scan drum (1), so that the light of the light source (5) again proceeds into the scanner element (3) as calibration light. Moreover, a high-voltage value $U_H$ that effect a gain of the light/voltage transducer unit (20, 21, 22) suitable for the acceptance of the diaphragm density table is set via a control signal value $S_A$ generated in the control signal generator (33).

Subsequently, the individual scan diaphragms (11) of the diaphragm wheel (12) that are identified by diaphragm numbers are successively pivoted into the beam path of the calibration light by turning the diaphragm wheel (12) with the assistance of the diaphragm wheel drive (15). The gray filter (14) of the filter wheel (13) is selected such that no over-modulation of the light/voltage transducer unit (20, 21, 22) occurs. The calibration light attenuated in this way is converted in the light/voltage transducer unit (20, 21, 22) into voltage values $U^*_B$ that are supplied via the line (26) to the calculating stage (27).

The diaphragm density table is determined in the calculating stage (27). To that end, the diaphragm density $D_B$ of the scan diaphragm (11) having the largest diaphragm aperture is set to zero, and the other diaphragm densities $D_B$ are respectively calculated as a logarithmized quotient from the currently measured voltage value $U^*_{B(n+1)}$ and from the previously measured voltage value $U^*_{B(n)}$, being calculated according to equation [2], and the diaphragm numbers of the corresponding scan diaphragms (11) are allocated to the calculated diaphragm densities $D_B$.

$$D_{B(n)} = \log U^*_{B(n+1)}/U^*_{B(n)} \qquad [2]$$

The diaphragm densities $D_B$ of the scan diaphragms (11) calculated in the calculating stage (27) are deposited for further employment in the diaphragm density table memory (30) of the calibration unit (28) as a diaphragm density table $D_B$=f (diaphragm number) addressable by the corresponding diaphragm numbers of the scan diaphragms (11).

An example of a diaphragm density table for a black-and-white scanner or for one color channel of a color scanner is reproduced below.

| Diaphragm No. | Diaphragm Density $D_B$ |
|---|---|
| 1 | 3.2041 |
| 2 | 3.0706 |
| 3 | 2.9371 |
| 4 | 2.8036 |
| 5 | 2.6701 |
| 6 | 2.5366 |
| 7 | 2,4031 |
| 8 | 2,2696 |
| 9 | 2.1361 |
| 10 | 2.0026 |
| 11 | 1.8691 |
| 13 | 1.6021 |
| 14 | 1.4686 |
| 15 | 1.3350 |
| 16 | 1.2015 |
| 17 | 1.0680 |
| 18 | 0.9345 |
| 19 | 0.8010 |
| 20 | 0.6675 |
| 21 | 0.5340 |
| 22 | 0.4005 |
| 23 | 0.2670 |
| 24 | 0.1335 |
| 25 | 0.0000 |

In a method step [C], the gray filter density $D_G$ is determined in the form of a gray filter density table for each gray filter (14) of the filter wheel (13) as a criterion for the light attenuation achieved with the corresponding gray filter (14).

Method step [C] is executed fundamentally as described under method step [B]. The individual gray filters (14) of the filter wheel (13) identified by filter numbers are pivoted into the beam path of the calibration light by turning the filter wheel (13) with the assistance of the gray filter drive (16). The scan diaphragm (11) is selected such that no overmodulation of the light/voltage transducer unit (20, 21, 22) occurs. The calibration light attenuated in this way is converted in the light/voltage transducer unit (20, 21, 22) into voltage values $U^*_B$ that are likewise supplied via the line (26) to the calculating stage (27).

The gray filter density table is determined in the calculating stage (27). For that purpose the gray filter density $D_G$ of the gray filter (14) having the lowest light attenuation factor is set to zero, and the other gray filter densities $D_G$ are likewise respectively calculated as a logarithmized quotient from the currently measured voltage value $U^*8_{B(n+1)}$ and from the previously measured voltage value $U^*_{B(n)}$, being calculated according to equation [3], and the filter numbers of the corresponding gray filters (14) are allocated to the calculated gray filter densities $D_G$.

$$D_{G(n)} = \log U^*_{B(n+1)}/U^*_{B(n)} \qquad [3]$$

The gray filter densities $D_{GF}$ calculated in the calculating stage (27) are deposited for further employment in the gray filter density table memory (31) of the calibration unit (28) as gray filter table $D_G$=f (filter number) addressable by the corresponding filter identification numbers of the gray filters (14).

An example of a gray filter density table for a black-and-white scanner or for one color channel of a color scanner is reproduced below.

| Filter No. | Gray Filter Density $D_G$ |
|---|---|
| 1 | 0.0000 |
| 2 | 0.3000 |
| 3 | 0.6000 |
| 4 | 0.9000 |
| 5 | 1.2000 |
| 6 | 1.5000 |
| 7 | 1.8000 |
| 8 | 2.1000 |

After the calculation of the three density tables, a scan diaphragm (11) of the diaphragm wheel (12) to be employed as the reference diaphragm and the corresponding reference diaphragm density $D_{RB}$ of the reference diaphragm from the diaphragm density table for the device-specific calibration of the light/voltage transducer unit (20, 21, 22) are determined in a method step [D].

For the implementation of method step [D], a minimum high-voltage value $U_H$ that effects a gain of the light/voltage transducer unit (20, 21, 22) suitable for the determination of the reference diaphragm is set via a control signal value $S_H$ generated in the control signal generator (33). Moreover, it is also seen to that no gray filter (14) of the filter wheel (13) is positioned in the beam path of the calibration light. The individual scan diaphragms (11) of the diaphragm wheel (12) are then successively pivoted in with the diaphragm wheel drive (18), and the corresponding voltage values $U^*_B$ are measured and evaluated.

Given a black-and-white scanner, that scan diaphragm (11) having the largest diaphragm aperture that still just supplies a voltage value $U^*_B$ lying below a limit voltage value $U_G$ is selected as a reference diaphragm. Expediently, the predetermined white level $U_W$ is selected as a limit voltage value $U_G$. The reference diaphragm density $D_{RB}$ belonging to the selected reference diaphragm is taken from the diaphragm density table deposited in the diaphragm density table memory (30) and is correspondingly marked therein. When, for example, the scan diaphragm (11) having diaphragm number "8" is selected as the reference diaphragm, this has the reference diaphragm density $D_{RB}$= 2.2696.

Given a color scanner, that scan diaphragm (11) that supplies a voltage value $U^*_B$ lying below the limit voltage value $U_G$ in all three color channels is selected as the reference diaphragm.

In a method step [E], the device-specific calibration of the light/voltage transducer unit (20, 21, 22) to a predetermined voltage level, preferably to the predetermined white level $U_W$, given positioning of the scanner element (3) on the transparent glass of the scanner drum (1) is then implemented with the reference diaphragm (11) identified in method step [D] and without interposition of a gray filter (14).

In the device-specific calibration, the calibration light attenuated by the reference diaphragm (11) that has been set proceeds onto the light/voltage transducer unit (20, 21, 22) that converts the attenuated calibration light into a voltage value $U^*_B$ as current actual voltage value $U_{IST}$ for a control. The respective actual voltage value $U_{IST}$ proceeds via the switchover unit (25) in the switch position "calibration" and via the line (26) onto a first input of the digital comparator (32). The respectively current actual voltage value $U_{IST}$ is compared in the digital comparator (32) to the predetermined white level $U_W$ present at a second input of the digital comparator (21) as rated voltage value $U_{SOLL}$.

Dependent on the current comparison result achieved in the digital comparator (32), which is supplied via a line (42) to the control signal generator (33), the control signal generator (33) generates increasing or decreasing control signal values $S_H$. The increasing or decreasing control signal values $S_H$, increase or reduce the gain of the photo multiplier (20) via the high-voltage values $U_H$ and, thus, the actual voltage value $U_{IST}$ until this corresponds to the rated voltage value $U_{SOLL}$ and the control signal generator (33) is turned off.

The gain of the photo multiplier (20) required for the coincidence between actual voltage value $U_{IST}$ and predetermined white level $U_W$ is kept constant by storing the corresponding reference control signal value $S_{RH}$ in the control signal generator (33). What the device-specific calibration achieves is that the predetermined white level $U_W$ is always achieved at the output of the light/voltage transducermeans (20, 21, 22) when scanning on the transparent glass of the scanner drum (1) with the reference diaphragm (11).

At the end of the device-specific calibration, moreover, the reference high-voltage density $D_{RH}$ previously calculated for the stored reference control signal value $S_{RH}$ is also determined from the deposited high-voltage density table and, together with the corresponding reference control signal value $S_{RH}$, is stored in the calculating stage (27) for further employment. When, for example, the identified reference control signal value $S_{RH}$ amounts to 400, the reference high-voltage density DRH=1.89 is taken from the high-voltage density table for this.

The device-specific calibration according to method steps [A] through [E] need only be repeated at large time intervals or when components are replaced, for example given replacement of a light source or of the photo multiplier.

The subsequent setting of the gain of the light/voltage transducer unit (20, 21, 22) according to method steps [F] and [G], by contrast, is dependent on the original and must therefore be implemented given every new image original (2) to be scanned.

In method step [F], the required scan diaphragm (11) for scanning the image original (2) and the required control signal value $S_H$ for the high-voltage generator (22) are determined for a second, master-dependent calibration of the light/voltage transducer unit (20, 21, 22).

The selection of the required scan diaphragm (11) of the diaphragm wheel (12) occurs according to the desired scan resolution in a fine scanning or a rough scanning of the image original (2). At the same time, the diaphragm density $D_B$ of the selected scan diaphragm (11) is taken from the stored diaphragm density table.

Among other things, the density $D_W$ of the white point of the image original (2) to be respectively scanned is required for determining the required control signal value $S_H$ of the high-voltage generator (22) of the light/voltage transducer unit (20, 21, 22). The white point density $D_W$ can be previously determined with a separate job preparation device or with the scanner device.

The white point density $D_W$ can be determined by manual, densimetric measuring of the white point of the image original (2) with the scanner element (3) or on the basis of an automatic analysis of the image scope of the image original (2) on the basis of the image values $U^*_B$ acquired by point-by-point and line-by-line scanning of the image original (2).

For automatic analysis of the image scope, the scanner element (3) first scans the image original (2) point-by-point and line-by-line. The image value is thereby acquired are stored in the image store (38) of the image processing means (39) via the switchover means (25) in the switch position "scan". The white point density $D_W$ of the image original (2) is determined in the originals' analysis unit (40) on the basis of the image values $U^*_B$ deposited in the image store (38) and is forwarded to the calculating stage (27) in the calibration unit (28) via the line (41).

The originals' analysis can occur, for example, according to DE-A-43 09 879. The image values $U^*_B$ for the originals' analysis can be acquired by a fine scanning (fine scan) or by a rough scanning (pre-scan or rough scan) of the image original (2). Given fine scanning, the image original (2) is scanned with the scan resolution required for the reproduction; in the rough scanning, it is scanned with a correspondingly coarser scan resolution and with a scan diaphragm that is enlarged compared to the normal scan diaphragm.

The calculation of the control signal value $S_H$ to be set ensues as follows after the determination of the white point density $D_W$ of the image original (2).

First, the diaphragm density difference $\Delta D_B$ between the reference diaphragm density $D_{RB}$ of the reference diaphragm identified in method step [D] and the diaphragm density $D_B$ of the scan diaphragm selected for the rough scanning or fine scanning is determined according to equation [4].

$$\Delta D_B = (D_{RB} - D_B) \qquad [4]$$

An overall density $D_{GS}$ is calculated according to equation [5] from the identified diaphragm density difference $\Delta D_B$, the white point density $D_W$, the reference high voltage density $D_{RH}$ determined in the first calibration in method step [E] and an offset density $D_O$ that takes potential fluctuations of the light intensity of the light source (5) into consideration.

$$D_{GS} = \Delta D_B + D_{RH} - D_W - D_O \qquad [5]$$

Denoting in equation [5] are:
$D_{GS}$=overall density
$\Delta D^B$=diaphragm density difference
$D_{RH}$=reference high-voltage density
$D_W$=white point density
$D_O$=offset density.

The offset density $D_O$, which is a criterion for the deviation of the light intensity of the light source (5) from a rated value, is determined, for example, via a control measurement on transparent glass and need be updated only at greater time intervals, for example when replacing the light source or the scanner drum.

When the master-dependent gain setting is to be implemented for a fine scanning of the image original (2), the white point density $D_W$ determined in the analysis of the original is inserted into equation [5]. When the master-dependent gain setting is to be implemented for a rough scanning for the purpose of an analysis of the original, the white point density $D_W$=0 is inserted into equation [5] since the white point density $D_W$ of the image original (2) is still unknown.

After the calculation of the overall density $D_{GS}$ as calibration density for the master-related gain setting, the control signal value $S_H$ that is allocated to that high-voltage density $D_H$ that corresponds in terms of value to the calculated overall density $D_{GS}$ is marked in the deposited high-voltage density table $D_H=f(S_H)$. The marked control signal value $S_H$ is then employed for setting the gain of the a light/voltage transducer unit (20, 21, 22).

When the calculated overall density $D_{GS}$ happens to lie outside the value range of the high-voltage densities $D_H$ of the high-voltage density table, a gray filter (14) of the filter wheel (13) is pivoted in in order to reduce the overall density $D_{GS}$ such that it lies within the value range of the high-voltage densities $D_H$. The required minimum gray filter density $D_{Gmin}$ is calculated according to equation [6], being calculated from the diaphragm density difference $\Delta D_B$, the white point density $D_W$ of the image original (2) and from the maximum high-voltage density $D_{Hmax}$ in the high-voltage density table.

$$D_{Gmin}=D_{GS}-D_{Hmax} \qquad [6]$$

The gray filter density $D_G$ of a gray filter (14) coming closest to the calculated gray filter density $D_{Gmin}$ is taken from the gray filter density table and the corresponding filter number of the gray filter (14) to be employed is identified.

The reduced overall density $G^*_{DS}$ then derives according to equation [7].

$$D^*_{GS}=D_{GS}-D_G \qquad [7]$$

Denoting in equation [7] are:
$D^*_{GS}$=reduced overall density
$D_{GS}$=calculated overall density
$D_G$=gray filter density of the employed gray filter.

When the desired values cannot be directly taken from the value tables, they can be calculated from the values present in the value tables on the basis of a simple linear interpolation calculation.

After the determination of the setting parameters, the master-related setting of the gain of the light/voltage transducer unit (20, 21, 22) occurs in the final method step [G], to which end, dependent on whether a fine scanning or a rough scanning of the image original (2) is to occur, the required scan diaphragm (11) and, potentially, the required gray filter (14) must be brought into the beam path of the scan light and the correspondingly calculated setting parameters must be set.

In conclusion, the invention shall be illustrated with reference to two examples.

EXAMPLE 1

When the scan diaphragm having the diaphragm number "5" is selected, the corresponding diaphragm density $D_B=2.6701$ derives from the diaphragm density table.

When the scan diaphragm having the diaphragm number "8" was determined as the reference diaphragm, the reference diaphragm density $D_{RB}=2.2696$ derives from the diaphragm density table.

The diaphragm density difference $\Delta D_B=(D_{RB}-D_B)=2.2696-2.6701=-0.4005$ is obtained from equation [4].

When it is also assumed that a reference control signal value $S_{RH}=400$ is found in the device-specific calibration and the reference high-voltage density $D_{RH}=1.89$ was taken therefor in the high-voltage density table and that a white point density $D_W=0.2000$ and an offset density $D_O=0.0700$ were found, the overall density results as $D_{GS}=\Delta D_B+D_{RH}-D_W-D_O=-0.4005+1.8900-0.2000-0.0700=1.2195$ according to equation [5]. The calculated overall density $D_{GS}$ lies within the value table, and no additional light attenuation is required, so that the gray filter (14) having the filter number "1" and the gray filter density $D_G-0.0000$ is selected.

The required control signal value $S_H=1681$ is then determined for the calculated overall density $D_{GS}$ by interpolation from the high-voltage density table.

EXAMPLE 2

When the scan diaphragm with the diaphragm number "15" is selected, the corresponding diaphragm density $D_B=1.3350$ derives from the diaphragm density table.

When the scan diaphragm having the diaphragm number "8" was again determined as the reference diaphragm, the referenced diaphragm density $D_{RB}=2.2696$ derives from the diaphragm density table.

The diaphragm density difference $\Delta D_B=(D_{RB}-D_B)=2.2696-1.3350=0.9346$ is obtained from equation [4].

When it is again assumed that a reference control signal value $S_{RH}=400$ was identified in the device-specific calibration and the reference high-voltage density $D_{RH}=1.89$ was taken therefor in the high-voltage density table and that a white point density $D_W=0.2000$ and an offset density $D_O=0.0700$ were identified, the overall density derives as $D_{GS}=\Delta D_B+D_{RH}-D_W-D_O=0.9346+1.8900-0.0200-0.0700=2.5546$ according to equation [5].

This time, the calculated overall density $D_{GS}=2.5546$ lies outside the value range of the high-voltage density table, so that a gray filter must be employed for reducing the density. In this case, a minimum gray filter density $D_{Gmin}=D_{GS}-D_{max}=2.5546-2.1000=0.4546$ is calculated according to equation [6] with $D_{Hmax}=2.1000$. The gray filter having the filter number "3" and the gray filter density $D_G=0.6000$ is then selected from the gray filter density table.

According to equation [7], the reduced overall density then derives as $D^*_{GS}=D_{GS}-D_G=2.5546-0.6000=1.9546$ and the corresponding control signal value is approximately $S_H=283$.

Although various minor changes and modifications might be proposed by those skilled in the art, it will be understood that our wish is to include within the claims of the patent warranted hereon all such changes and modifications as reasonably come within our contribution to the art.

We claim:

1. A method for calibration of an optoelectronic scanner element of a scanner device for point-by-point and line-by-line scanning of an image original, comprising the steps of:
    illuminating an image original and converting scan light modulated with densities of the scanned image original into image values with a light/voltage transducer unit;
    predetermining a white level;
    undertaking the calibration of the scanner element by changing a gain of the light/voltage transducer unit such that an image value generated when scanning a brightest location of the image original, a white point, corresponds to the predetermined white level;
    charging the light/voltage transducer unit with a calibration light;
    measuring transducer densities as a criterion for attenuation of the calibration light respectively simulated by different gains from measured image values $U^*_B$ given different gains of the light/voltage transducer unit, and allocating identified transducer densities $D_H$ to the corresponding gains as a transducer density table;
    determining diaphragm densities $D_B$ as a criterion for the attenuation of the calibration light achieved with respective scan diaphragms from the image values $U^*_B$ that were measured given different scan diaphragms in the calibration light, and allocating the identified diaphragm densities $D_B$ to the corresponding scan diaphragms as a diaphragm density table;

determining a reference diaphragm and a corresponding reference diaphragm density $D_{RB}$ from the diaphragm density table;

implementing a calibration with the identified reference diaphragm by setting the gain of the light/voltage transducer unit such that the image value $U^*_B$ acquired with the calibration light attenuated by the reference diaphragm corresponds to the predetermined white level $U_W$, and determining a reference transducer density $D_{RH}$ belonging to the gain that has been set from the transducer density table;

determining the scan diaphragm for scanning the image original and the corresponding diaphragm density $D_B$ from the diaphragm density table;

calculating an overall density $D_{GS}$ from the reference diaphragm density $D_{RB}$, the reference transducer density $D_{RH}$, the diaphragm density $D_B$ of the scan diaphragm and from the density $D_W$ of the white point of the image original;

determining a gain of the light/voltage transducer unit that is allocated in the transducer density table to that transducer density $D_H$ that corresponds to the calculated overall density $D_{GS}$ and;

setting the gain that has been determined at the light/voltage transducer unit for scanning the image original.

2. The method according to claim 1, wherein for calculating the overall density $D_{GS}$:

the diaphragm density difference $\Delta D_B$ between the identified reference diaphragm density $D_{RB}$ and the diaphragm density $D_B$ of the scan diaphragm is calculated according to the equation $\Delta D_B=(\Delta D_{RB}-\Delta D_B)$; and the overall density $D_{GS}$ is calculated from the diaphragm density difference $\Delta D_B$, the reference diaphragm density $D_{RB}$ and the density $D_W$ of the white point of the image original according to the equation $D_{GS}=\Delta D_B+D_{RH}-D_W$.

3. The method according to claim 1 wherein gray filter densities $D_G$ are determined from the image values $U^*_B$ that are measured given different gray filters in the calibration light, being measured as a criterion for the attenuation of the calibration light achieved with the respective gray filters, and the identified gray filter densities $D_G$ are allocated to the corresponding gray filters as gray filter density table;

the calculated overall density $D_{GS}$ is reduced by a gray filter density $D_{Gmin}$ when it lies outside a value range of the transducer density table such that a reduced overall density $D^*_{GS}$ lies within the value range of the transducer density table;

a required gray filter density $D_{Gmin}$ is calculated by forming a difference between the overall density $D_{GS}$ and a maximum density value $D_{Hmax}$ of the transducer density table according to the equation $D_{Gmin}=D_{GS}-D_{Hmax}$; and the gray filter allocated to the calculated gray filter density $D_{Gmin}$ in the gray filter density table is identified and employed for the attenuation of the calibration light.

4. The method according to claim 1 wherein values that cannot be directly taken from the density tables are identified by interpolation.

5. The method according to claim 1, wherein for determining the transducer density table:

the transducer density $D_H$ allocated to the maximum gain is set equal to zero;

gains describing graduated from the maximum gain are prescribed; and the transducer densities $D_H$ for the descending gains are respectively calculated as a logarithmized quotient from a currently measured image value $U^*_{B(n+1)}$ and a previously measured image value $U^*_{Bn}$.

6. The method according to claim 5 wherein the calibration light incident onto the light/voltage transducer unit in the determination of the transducer density table is attenuated with a scan diaphragm such that no over-modulation occurs.

7. The method according to claims 1, wherein for determining the diaphragm density table:

respective scan diaphragms having different diaphragm apertures are brought into the calibration light;

the diaphragm density $D_B$ is set to zero for a scan diaphragm having a largest diaphragm aperture; and the diaphragm densities $D_B$ for the various scan diaphragms are respectively calculated as a logarithmized quotient of a currently measured image value $U^*_{B(n+1)}$ and a previously measured image value $U^*_{Bn}$.

8. The method according to claim 7 wherein the gain is set in the determination of the diaphragm density table such that no over-modulation occurs.

9. The method according to claims 1 wherein for determining the reference diaphragm:

a suitable gain of the light/voltage transducer unit is set;

the image values $U^*_B$ achieved given the various scan diaphragms are compared to a limit value $U_G$; and one of the scan diaphragms is selected as a reference diaphragm on the basis of the comparison.

10. The method according to claim 9 wherein given a black-and-white scanner, the scan diaphragm having the larger diaphragm aperture is selected as a reference diaphragm with which an image value $U^*_B$ lying below the limit value $U_G$ is achieved.

11. The method according to claim 9, wherein given a color scanner, that scan diaphragm is selected as the reference diaphragm with which an image value $U^*_B$ lying below the limit value $U_G$ is generated in all three color channels.

12. The method according to claims 9 wherein the white level $U_W$ is selected as a limit value $U_G$.

13. The method according to claim 1 wherein the scan diaphragm is selected for scanning the image original in conformity with the desired scan resolution.

14. The method according to claim 1 wherein the optical density $D_W$ of the white point of the image original is determined by densimetric measuring of the brightest location of the image original.

15. The method according to claim 1 wherein the image original is optoelectronically scanned point-by-point and line-by-line, and the image values thereby acquired are digitized and stored; and the optical density $D_W$ of the white point of the original is determined by an analysis of the original on the basis of the stored, digital image values.

16. The method according to claim 5 wherein the image values for the analysis of the original are acquired by scanning the image original with a scan fineness that is coarser compared to the normal scan fineness.

17. The method according to claim 1 wherein for determining the gray filter density table:

respective gray filters having different light attenuation factors are introduced into the calibration light;

the gray filter density $D_G$ is set to zero for the gray filter having the highest light attenuation factor; and the gray filter densities $D_B$ for the different gray filters are respectively calculated as a logarithmized quotient of a currently measured image value $U^*_{B(n+1)}$ and the previously measured image value $U^*_{Bn}$.

18. The method according to claim 17, wherein the calibration light is attenuated with a scan diaphragm in the determination of the gray filter density table such that no over-modulation occurs.

19. The method according to claim 1 wherein the scan diaphragms are identified by diaphragm numbers; and the identified diaphragm densities $D_B$ of the diaphragm density table are stored addressable by the diaphragm numbers of the corresponding scan diaphragms.

20. The method according to claims 1 wherein gray filters are identified with filter numbers; and identified gray filter densities $D_G$ of the gray filter density table are stored addressable by the gray filter numbers of the corresponding gray filters.

21. The method according to claim 1 wherein the light/voltage transducer unit is formed of a photo multiplier, of a following current/voltage converter and of a high-voltage generator controlled by a control signal value $S_H$ whose high-voltage values determine the gains of the light/voltage transducer unit;

the graduated gains are set by graduated control signal values $S_H$; and the identified transducer densities $D_H$ are stored as a transducer density table $D_H=f(S_H)$ callable by the corresponding control signal values $S_H$.

22. The method according to claim 1, wherein the light/voltage transducer unit is formed of a photo multiplier, of a following current/voltage converter and of a high-voltage generator controlled by a control signal values $S_H$ whose high-voltage values determine the gains of the light/voltage transducer unit;

graduated control signal values $S_H$ are generated as rated values for the calibration;

the image values $U^*_B$, as actual values, are compared to the control signal values $S_H$; and the control signal values $S_H$ achieved given equality are stored.

23. The method according to claim 1 wherein the calibration light is generated by the light source the scanner device employed for scanning the originals.

24. The method according to claim 1 wherein the method is applied to each color channel of a color scanner.

25. A method for calibration of an optoelectronic scanner element of a scanner device for point-by-point and line-by-line scanning of an image original, comprising the steps of:

illuminating an image original and converting scan light modulated with densities of the scanned image original into image values with a light/voltage transducer unit;

predetermining a white level;

undertaking the calibration of the scanner element by changing a gain of the light/voltage transducer unit such that an image value generated when scanning a brightest location of an image original, a white point, corresponds to the predetermined white level;

charging the light/voltage transducer unit with a calibration light;

measuring transducer densities as a criterion for attenuation of the calibration light respectively simulated by different gains from measured image values given different gains of the light/voltage transducer unit, and allocating identified transducer densities to the corresponding gains as a transducer density table;

determining diaphragm densities as a criterion for the attenuation of the calibration light achieved with respective scan diaphragms from the image values that were measured given different scan diaphragms in the calibration light, and allocating the identified diaphragm densities to the corresponding scan diaphragms as a diaphragm density table;

determining a reference diaphragm and a corresponding reference diaphragm density from the diaphragm density table;

implementing a calibration with the identified reference diaphragm by setting the gain of the light/voltage transducer unit such that the image value acquired with the calibration light attenuated by the reference diaphragm corresponds to the predetermined white level, and determining a reference transducer density belonging to the gain that has been set from the transducer density table;

determining the scan diaphragm for scanning the image original and the corresponding diaphragm density from the diaphragm density table;

calculating an overall density from the reference diaphragm density, the reference transducer density, the diaphragm density of the scan diaphragm and from the density of the white point of the image original;

determining a gain of the light/voltage transducer unit that is allocated in the transducer density table to that transducer density which corresponds to the calculated overall density and;

setting the gain that has been determined at the light/voltage transducer unit for scanning the image original.

* * * * *